(12) United States Patent  
Liu et al.

(10) Patent No.: US 8,167,469 B2
(45) Date of Patent: May 1, 2012

(54) SURFACE LIGHT EMITTING APPARATUS EMITTING LASER LIGHT

(75) Inventors: Xinbing Liu, Acton, MA (US); Janet Milliez, Somerville, MA (US)

(73) Assignee: Panasonic Corporation, Osaka (JP)

(*) Notice: Subject to any disclaimer, the term of this patent is extended or adjusted under 35 U.S.C. 154(b) by 408 days.

(21) Appl. No.: 12/404,767

(22) Filed: Mar. 16, 2009

(65) Prior Publication Data

US 2009/0237766 A1 Sep. 24, 2009

Related U.S. Application Data

(60) Provisional application No. 61/038,264, filed on Mar. 20, 2008.

(51) Int. Cl.
*F21V 7/04* (2006.01)
(52) U.S. Cl. .............. 362/553; 362/259; 362/296.1
(58) Field of Classification Search ........ 362/97.1, 362/97.2, 97.3, 227, 244, 245, 246, 249.02, 362/269, 270, 282, 296.1, 308, 309, 311.12, 362/553, 555, 558, 607, 608, 612, 613, 615, 362/616, 619, 622, 628, 800; 359/530
See application file for complete search history.

(56) References Cited

U.S. PATENT DOCUMENTS

| | | | | |
|---|---|---|---|---|
| 4,216,439 A * | 8/1980 | Pond et al. | ............ | 372/20 |
| 4,852,956 A * | 8/1989 | Kramer | ............ | 359/17 |
| 5,237,367 A * | 8/1993 | Kudo | ............ | 355/67 |
| 5,764,828 A * | 6/1998 | Iga et al. | ............ | 385/36 |
| 6,597,507 B1 * | 7/2003 | Asami | ............ | 359/572 |
| 6,944,204 B2 * | 9/2005 | Zhou et al. | ............ | 372/109 |
| 7,688,491 B2 * | 3/2010 | Saisho et al. | ............ | 359/205.1 |
| 7,740,392 B2 * | 6/2010 | Itoh et al. | ............ | 362/625 |
| 2005/0154268 A1 * | 7/2005 | Hwang et al. | ............ | 600/316 |
| 2006/0072339 A1 * | 4/2006 | Li et al. | ............ | 362/608 |
| 2007/0273810 A1 * | 11/2007 | Lee et al. | ............ | 349/65 |
| 2008/0025043 A1 * | 1/2008 | Lee | ............ | 362/608 |
| 2009/0109658 A1 * | 4/2009 | Karakawa | ............ | 362/97.2 |
| 2009/0109706 A1 * | 4/2009 | Hsu | ............ | 362/611 |
| 2009/0237915 A1 | 9/2009 | Liu et al. | | |

FOREIGN PATENT DOCUMENTS

| JP | 3-198023 | | 8/1991 |
|---|---|---|---|
| JP | 05205310 A | * | 8/1993 |
| JP | 10-241418 | | 9/1998 |
| JP | 2001-345008 | | 12/2001 |
| JP | 2003-297127 | | 10/2003 |
| JP | 2006-47422 | | 2/2006 |
| JP | 2006-190647 | | 7/2006 |

* cited by examiner

*Primary Examiner* — Hargobind S Sawhney
(74) *Attorney, Agent, or Firm* — Hamre, Schumann, Mueller & Larson, P.C.

(57) ABSTRACT

A surface light emitting apparatus capable of providing uniform illumination while efficiently using a laser light. The apparatus comprises a light source section that includes at least one light source which emits laser beam; an optical element section that includes at least one diffractive optical element section that modifies a wavefront of the laser beam emitted from the light source section by diffraction action; and an optical guiding section that guides from an incidence surface of the optical guiding section the laser beam emitted from the diffraction optical section and emits the laser beam from a radiation surface of the optical guiding section.

1 Claim, 10 Drawing Sheets

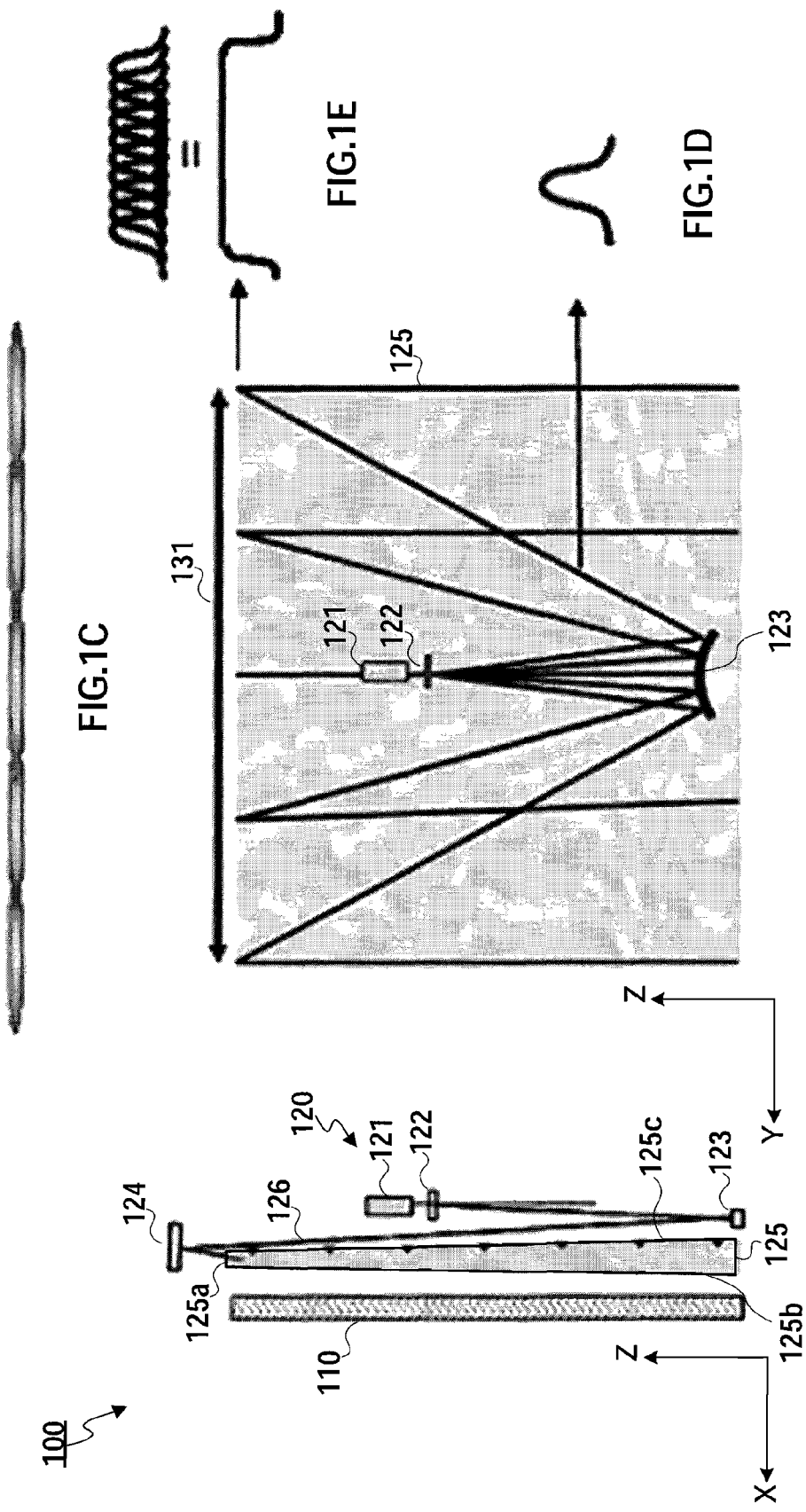

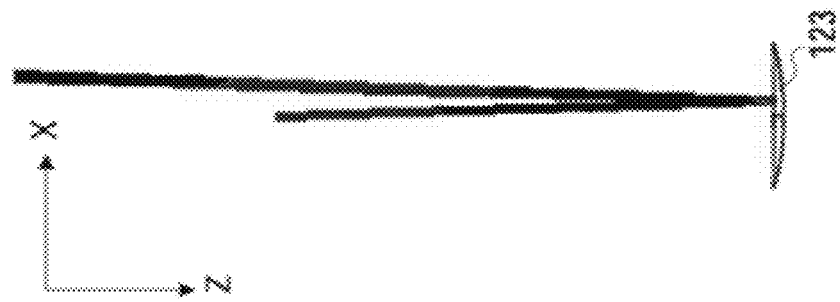
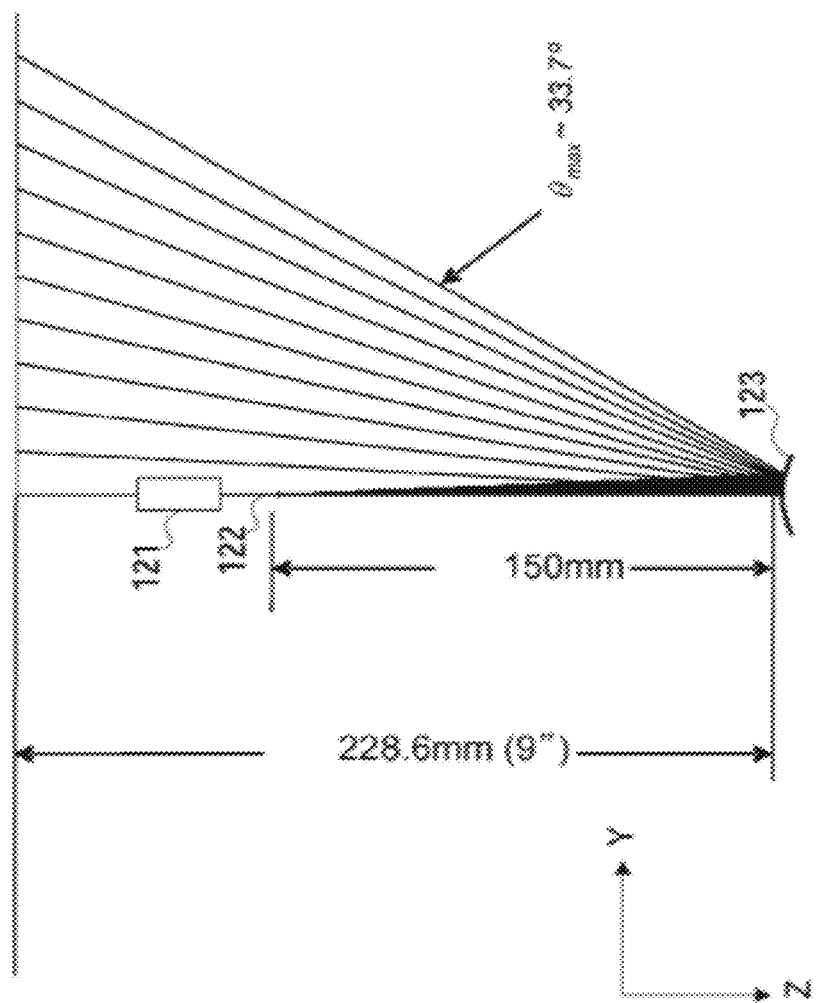

SURFACE LIGHT EMITTING APPARATUS EMITTING LASER LIGHT

CROSS REFERENCE TO RELATED APPLICATIONS

This application claims the benefit of U.S. provisional application Ser. No. 61/038,264, filed on Mar. 20, 2008, which is incorporated herein by reference in its entirety.

BACKGROUND OF THE INVENTION

1. Field of the Invention

The present invention relates to a surface light emitting apparatus emitting laser light, and more particularly, to a method for illuminating uniformly a backlight panel of a laser display by means of incoherent laser beam shaping and a refractive optics.

2. Description of the Related Art

In recent years the need for flat panel displays has increased, in applications such as laptop screens, cellular phones screen and other portable devices, desk-top monitors, TV, etc. With the emergence of light valve type displays (e.g. liquid crystal displays (LCDs)) as one of the leader technologies in the flat panel industry, efforts are being made on improving backlighting: emitters as well as lighting techniques. The requirements on emitting materials include high brightness, efficiency, contrast and accurate RGB chromaticity, while device technology requires factors such as thin form, scalability (large to micro-displays), and low cost.

Until now, backlighting relied on broadband emitters such as fluorescent lamps as they are very bright and efficient white light emitters. However, their broad spectrum requires that most of the light generated be filtered out because it is at the wrong wavelength. About 70% of the light is thusly thrown away and the filtering technology involved to obtain the correct RGB TV colors is complex and expensive. In addition to decreasing the overall efficiency of the process, the unused emission results in undesirable heating of the display, triggering a search for alternatives.

With the recent development of efficient, high power blue, green and red laser sources, laser-based backlighting is emerging as a possible solution. These lasers provide narrow spectrum at the RGB TV colors, eliminating the need of complex filtering technology, and can be packaged into small size units, making them suitable for flat panel displays. In addition to being more energy efficient than lamp-based backlights, another obvious advantage of laser backlights is much broader color gamut coverage that gives much more vivid color displays. They also provide a more environmentally friendly alternative to mercury-based lamps.

However, laser light also differs with lamps in that it has different radiometric properties: laser light emits in a determined direction and generally has a Gaussian intensity profile, whereas lamps are Lambertian emitters (i.e. emit uniformly in all directions). Therefore new light shaping techniques adapted to laser light need to be developed in order to use efficiently laser sources in backlighting applications. One requirement is to illuminate uniformly the back panel (light guide plate) of LCD displays with wasting as little light as possible.

One technique is to use a light-guide (e.g., optical fiber) leaking light all along a side of the back panel, taking advantage of the possibility of efficiently coupling laser light into a fiber. However the "leaks" need to be carefully controlled to obtain uniform illumination while not wasting unused light (all light needs to have been leaked within the back panel at an incidence surface that is an end face of the back panel). This can lead to a high degree of complexity in design and fabrication. It is desirable to achieve a simpler design where uniformity can be more easily controlled while keeping high efficiency and that for any sizes (small and large displays).

Another technique is to use light integrators type of filters to homogenize the light (spatial light modulators for instance), but these are mainly used with broad-band types of white light, and not recommended for laser light. For instance, a light integrator can improve beam uniformity, but is not intended to scale the illumination to larger displays, and more optics has to be introduced, which lowers the efficiency of the method.

SUMMARY OF THE INVENTION

Therefore, it is an object of the present invention to provide a surface light emitting apparatus capable of providing uniform illumination while efficiently using a laser light.

To achieve the above-mentioned object, the present invention provides a surface light emitting apparatus comprising: a light source section that includes at least one light source which emits laser beam; an optical element section that includes at least one diffractive optical element that modifies a wavefront of the laser beam emitted from the light source section by diffraction action; and an optical guiding section that guides from an incidence surface of the optical guiding section the laser beam emitted from the diffraction optical section and emits the laser beam from a radiation surface of the optical guiding section.

We propose the use of incoherent beam shaping, i.e., shaping through diffractive optics elements (DOE). Diffractive optics can split a collimated laser beam into many beams (diffractive orders) at determined angles. The new beams bear the same properties as the initial beam, with the power in each beam depending on the diffraction efficiency in each order which can be controlled more or less accurately with a good design and good fabrication. If all diffracted beams have the same power, they can form a uniform line of dots (i.e., a line of light) on a target plane. It is possible to obtain a good uniformity and efficiency with DOEs providing that the maximum diffractive order (or equivalently, the maximum angle of diffracted beam) is small. However, efficiency and uniformity drop dramatically when higher diffractive orders are required (larger angles of diffraction), as it would be to form a long line for a large display. The reason for this is that performing DOE designs use the small angle approximation theory (scalar theory), which limits its application to small angles. (See "Diffractive Optics: Design, Fabrication, and Test" by D. C. O'Shea et al, SPIE Tutorial Texts, Vol. TT62, SPIE Press, 2004). The consequence is that, with DOE alone, this solution is difficult to scale up. Here we propose an integrated method using high efficiency-, high uniformity-DOEs which is applicable to all sizes of displays, without degrading neither the efficiency nor the uniformity of the system. This solution also provides a way to eliminate speckles, which are the grainy texture inherent to laser a light and are undesirable for displays.

BRIEF DESCRIPTION OF THE DRAWINGS

FIG. 1A is a block diagram illustrating a schematic structure of a flat panel display including a surface light emitting apparatus according to one embodiment of the present invention;

FIG. 1B is a schematic diagram for illustrating the principle of laser beam shaping according to the present embodiment;

FIG. 1C is a cross-sectional view of a beam after a collimating mirror.

FIG. 1D is a schematic diagram illustrating a Gaussian intensity profile of one beam.

FIG. 1E is a schematic diagram illustrating a flat-top profile on target;

FIG. 2A is a diagram showing an example of a simulation result for illustrating the principle of the laser beam shaping according to the present embodiment;

FIG. 2B is a diagram showing the simulation result of FIG. 2A, viewed from another direction;

FIG. 10C is a diagram illustrating the DOE array of FIG. 10B;

DETAILED DESCRIPTION OF THE PREFERRED EMBODIMENT

Figure 3:
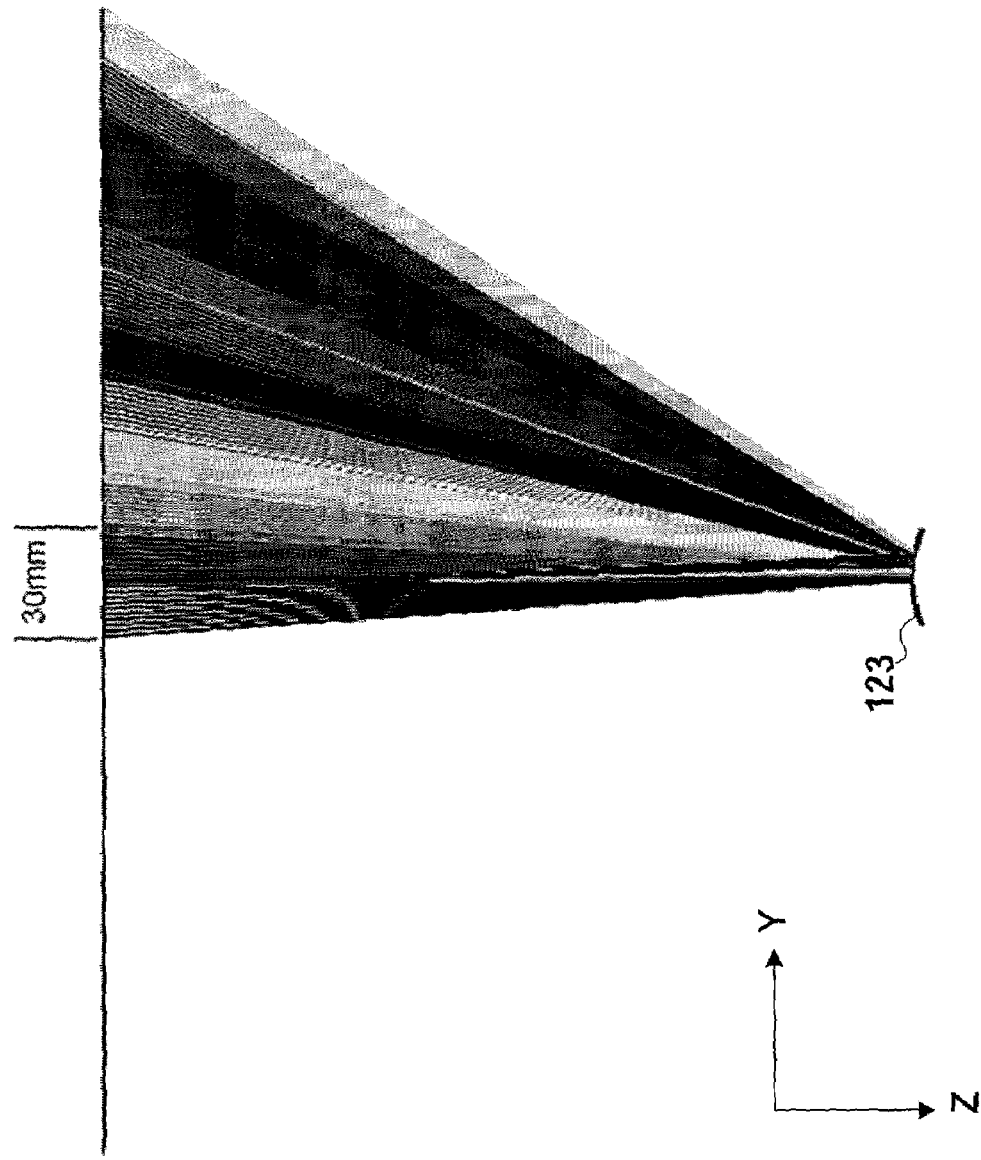
FIG. 3 is a diagram showing an example of a simulation result of the beam size according to the present embodiment.

An embodiment of the present invention will be described below with reference to the drawings.

FIGS. 1A-1E illustrate a schematic layout of a back-lit panel using laser light and principle of incoherent beam shaping for uniform illumination of back panel (light guide plate). For clarity, only a few beams are represented in these figures. These figures are not to scale, with exaggerated features.

More specifically, FIG. 1A is a block diagram illustrating a schematic structure of a flat panel display including a surface light emitting apparatus according to one embodiment of the present invention; FIG. 1B is a schematic diagram for illustrating the principle of laser beam shaping according to the present embodiment; FIG. 1C is a cross-sectional view of a beam after a collimating mirror; FIG. 1D is a schematic diagram illustrating a Gaussian intensity profile of one beam; and FIG. 1E is a schematic diagram illustrating a flat-top profile on target.

As shown in FIG. 1A, flat panel display 100 mainly comprises display panel 110 and surface light emitting apparatus 120. Display panel 110 is, for example, a LCD panel, and includes several components (not shown), such as polarizing plate, liquid crystal cells, and a color filter. Flat panel display 100 allows a planar laser light emitted from surface light emitting apparatus 120 to enter display panel 110, and makes use of the transmission and blocking phenomenon of light that occurs in display panel 110 to display an image.

Surface light emitting apparatus 120 mainly comprises laser source section (hereinafter may also be simply referred to as "laser") 121, diffractive optics element (DOE) 122, convex cylindrical mirror 123, cylindrical collimating mirror 124, and optical guiding section 125. DOE 122 is one of the features of the present invention and described in detail below. Optical guiding section 125 functions as a back panel. Optical guiding section 125 guides laser light 126 from incidence surface 125a and emits laser light from radiation surface 125b, emitting light from the entire panel surface. In addition to this function of guiding the entered laser light, optical guiding section 125 also functions as a diffuser to diffuse the entered laser light. Note that in this embodiment, the lateral and longitudinal directions of incidence surface 125a of optical guiding section 125 represent the X-axis and the Y-axis, respectively, and the direction perpendicular to the X- and Y-axis represents the Z-axis, as shown in FIGS. 1A and 1B.

The present invention is a technique for illuminating uniformly and without speckles the back panel (optical guiding section 125) of, for example, a flat screen LCD type of display of small and large sizes (e.g., but not restricted to, 5" to 32" panels) using lasers 121 as light sources. This technique includes the use of diffractive optical elements (DOEs) 122 and therefore it is called "incoherent" beam shaping, but these DOEs 122 are used in combination with other optical elements specifically designed for this method to provide uniform illumination of the back panel and scaling to any size of displays. This method is to shape and direct the laser beam with optical elements so that the laser beam can be used for the homogeneous and speckle-free illumination of a diffuser, i.e., optical guiding section 125, parallel to LCD panel 110 in, for example, a flat screen configuration. This method is shown schematically in FIGS. 1A and 1B, and involves 4 major steps which we will describe first briefly, then in more details.

1) The laser light propagates along the back side 125c of the back panel (optical guiding section 125). The laser beam goes through a high efficiency-, high uniformity-DOE 122. DOE 122 splits the laser beam into many beams of equal power as to form a line of light in one direction only, in order to produce a thin uniform line of light along the longitudinal direction of incidence surface 125a of the back panel. DOE 122 corresponds to a diffractive optical element that modifies the wavefront of the laser beam emitted from light source section (laser) 121 by diffraction action. For example, in FIGS. 1A and 1B, only the zero-order beams of DOE 122 are shown as laser beams after passing through DOE 122. In order to ensure the high performance of DOE 122, the maximum deflection angle for the split beams is kept small (for instance, less than 5 degrees for 532 nm laser beam), ensuring small angle approximation situation for the proper design of DOE 122.

2) Then in order to scale the line of light to any length, the fan of beam is expanded in one direction by a cylindrical powered surface (i.e., either a refractive or a reflective cylindrical element). Here we describe convex cylindrical mirror 123 (i.e., reflective case), which has the advantages of having no dispersion and no power loss at the surface (contrary to using a lens). The powered surface of convex cylindrical mirror 123 is conical, which is simple to fabricate while still achieving the expected performances. Convex cylindrical mirror 123 is at a slight angle with respect to the plane of incidence so that the reflected beams do not get clipped by DOE 122 and laser 121. As can be seen in, for instance, FIG. 1B, the illumination is uniform in direction 131 indicated by the arrow.

3) Then the fan of beams is reflected by collimating mirror 124. This collimating mirror 124 is, for example, a concave cylindrical mirror rendering the beams parallel to each other to illuminate uniformly the diffusive back panel (optical guiding section 125), which in turn directs light on LCD panel 110 where it is modulated to display an image. With such use of mirrors, the propagation of the laser light can be made almost parallel to back side 125c of the back panel. Therefore, unlike in a projection display or tube where the light source is perpendicular to the screen, here the display remains thin.

4) Finally, in order to eliminate the speckles of the laser light, the beam is kept in motion of small amplitude and adequate frequency to slightly be displaced around its position of alignment. The small perturbation created by the motion will modify the temporal coherence of the laser beam to the human eye, eliminating the speckle effect. To that affect, one piece of optics is kept in motion. For instance, convex cylindrical mirror 123 that expands a beam can be moved laterally or tilted back and forth. Another solution is to use a folding mirror in the path of the laser beam prior to DOE 122, and have this folding mirror provide the continuous displacement of the beam, as described below.

Optical guiding section 125 will now be described, followed by a detail description of each step.

As mentioned above, optical guiding section 125 guides laser light 126 from incidence surface 125a and emits laser light from radiation surface 125b, emitting light from the entire panel surface. Optical guiding section 125 is made of, for example, polymethylmethacrylate (PMMA), polycarbonate (PC), or cycloolefin copolymer (COP). Optical guiding section 125 also has, for example, a light-diffusing layer disposed on its radiation surface 125b and a reflective layer disposed on its back side opposed to radiation surface 125b. The light-diffusing layer is made of a translucent resin including light-diffusing material. As the light-diffusing layer, for example, polyethylene terephthalate material whose surface has fine irregularity (convexoconcave) may be used, or white ink that diffusely reflects light may be printed on the radiation surface 125b. In such cases, the degree of diffusion of the light-diffusing layer can be varied by adjusting the magnitude of the fine irregularity or the diameters of individual dots by white ink. As the reflective layer, a metal film may be used, or a metal coating may be applied to the back side using, for instance, deposition methods. It should be noted that the distribution of the degree of diffusion on radiation surface 125b is such that the brightness of laser beam 126 to be emitted is uniform. Specifically, the light-diffusing layer provided on radiation surface 125b, has varying degree of diffusion depending on the distance from incidence surface 125a along the Z-axis direction in such a way that the brightness is uniform in the Z-axis direction. For example, if the larger the distance from incidence surface 125a, the larger the degree of diffusion, then the brightness in the Z-axis direction may be uniform. Laser light 126 incident on optical guiding section 125 propagates inside optical guiding section 125 while repeating total reflections, and is diffused at the light-diffusing layer disposed on radiation surface 125b. Consequently, a portion of the diffused laser light 126 is incident on radiation surface 125b at a smaller angle than a critical angle. This portion of the laser light exits uniformly from radiation surface 125b. As a result, optical guiding section 125 provides uniform illumination across its surface.

Now we provide more details on each step.

The fabrication and production of DOE 122 is now a well known process with many vendors producing good quality elements, providing that the initial design is good. The design and fabrication of DOE 122 are described for instance in "Diffractive Optics: Design, Fabrication, and Test" by D. C. O'Shea et al, SPIE Tutorial Texts, Vol. TT62, SPIE Press, 2004. Still, good and feasible designs possible to manufacture and produce in a less expensive manner rely on scalar theory (small angle approximation). In this regime, the angle between two adjacent orders is constant, the angle of an output beam is proportional to its order of diffraction and the relation between output beam and incident beam is linear. This is no longer valid for large angles of diffraction, in which case these relations become non-linear. This means these design methods, optimized to produce high performance small angle DOEs, will not give good results for high angle DOEs. To this day, to our knowledge, there are no design methods to accurately design large angle DOE with high efficiency and high uniformity in a way that can be implemented at a production level. Therefore, one DOE alone cannot achieve efficiently long lines which are uniform. In addition to this, higher angle DOEs are more sensitive to misalignment of the incident beam: it is optimized only for normal incidence. With a small angle DOE, a small change in incident angle results in the same linear change in output angle and doesn't alter the performances of the DOE (it simply creates a small DC-type of offset for the fan of beams) For large angles, this change is no longer linear, altering and damaging the performances of the DOE. As mentioned above, a part of this method is to eliminate the speckles by intentionally varying slightly the angle of incidence of the beam, therefore small angle DOEs are preferred. This is why this method uses small angle DOEs in combination with other optics.

For instance, for 532 nm laser beam (green), DOE 122 can be designed to produce a half-fan angle of 2 degrees, with 61 beams, with an efficiency no less than 90% and uniformity no less than 96%. Here for demonstration purposes, we designed, for 532 nm, DOE 122 producing 21 beams (diffraction order m=−10 to 10), with a half-fan angle of 2.5 deg, yielding an efficiency of 91.6% and non-uniformity of 2.6%. We modeled this DOE 122 into ray tracing software ZEMAX™ to illustrate the design of convex cylindrical mirror 123 and cylindrical collimating mirror 124.

FIG. 2A is a diagram showing an example of a simulation result for illustrating the principle of the laser beam shaping according to the present embodiment, and FIG. 2B is a diagram showing the simulation result of FIG. 2A, viewed from another direction.

More specifically, FIGS. 2A and 2B show, for instance, a ZEMAX™ simulation of a configuration for a 15" 4:3 screen. Here DOE 122 produces 21 beams with a maximum fan half-angle of 2.5 deg. It becomes 33.7 deg after convex cylindrical mirror 123. Convex cylindrical mirror 123 is designed to give equally spaced beams at the desired location. The sag of convex cylindrical mirror 123 is conical. Convex cylindrical mirror 123 is slightly tilted with respect to the plane of incidence so that DOE 122 doesn't clip reflected beams. Here one ray represents one Gaussian beam (size of beams not represented).

Convex cylindrical mirror 123 is used to expand in one direction the small fan produced by DOE 122 into any fan size in order to obtain a line of light of any length by equidistant dots in the longitudinal direction of the back panel. The screens are proportioned 4:3 or 16:9. For instance, for a 15" 4:3 screen, the length of the display is 12" (304.8 mm) and its height is 9" (228.6 mm). The beam can be shaped into a 304.8 mm line of light with convex cylindrical mirror 123 placed at the bottom (surface opposed to incidence surface 125a) of the back panel. In this case the fan angle to produce is a tan(⅔) =33.7 degrees. FIGS. 2A and 2B show a ZEMAX™ simulation illustrating how the +/−2.5 degrees fan of 21 beams from the exemplary DOE 122 described above are transformed into +/−33.7 degrees fan, with equally spaced rays at the top (incidence surface 125a) of the back panel (here, one ray represents one beam, size of beams not represented). The sag of convex cylindrical mirror 123 is conical as expressed in the following equation:

$$z = \frac{cy^2}{1 + \sqrt{1 - (1+k)c^2 y^2}}$$

In this example, the curvature c is not greater than 24 mm$^{-1}$ and the conic constant k is not greater than −4. FIG. 3 also shows how convex cylindrical mirror 123 is tilted in the plane normal to the plane of incidence, so that the reflected beams are not clipped by DOE 122.

FIG. 3 shows a ZEMAX™ simulation of beam size on target for an initial beam size of 1.5 mm diameter. Due to convex cylindrical mirror 123, each 1.5 mm beam expands to 30 mm along the Y-direction so that all adjacent dots form a line of light indicated by a solid continuous line on target (here, top (incidence surface 125a) of the back panel). Convex cylindrical mirror 123 being cylindrical, in the X-direction the size increases according to the divergence of the input laser beam. For a small divergence, the line of light remains thin in the X-direction.

Convex cylindrical mirror 123 also expands in the same direction the individual laser beams which are no longer collimated after convex cylindrical mirror 123 in that direction, as shown in FIG. 3, where the initial 1.5 mm beams of the example of FIGS. 2A and 2B expand to 30 mm beams. The angle separation between adjacent beams can be calculated so that the size of the beams on cylindrical collimating mirror 124 fills the gap between two dots, rendering the line of light continuous (rather than made of resolved dots). Note that adjacent Gaussian beams may partially overlap due to their Gaussian intensity profile, in order to have a resulting intensity profile with a flattened top side, i.e., flat-top type of intensity for the whole line of light. In the other direction (non-power direction of convex cylindrical mirror 123), the beam size only expands according to the divergence of the laser beam, which in most laser is small (no more than 1 mrad), so the line of light will remain thin (a few millimeters).

Figure 4B:
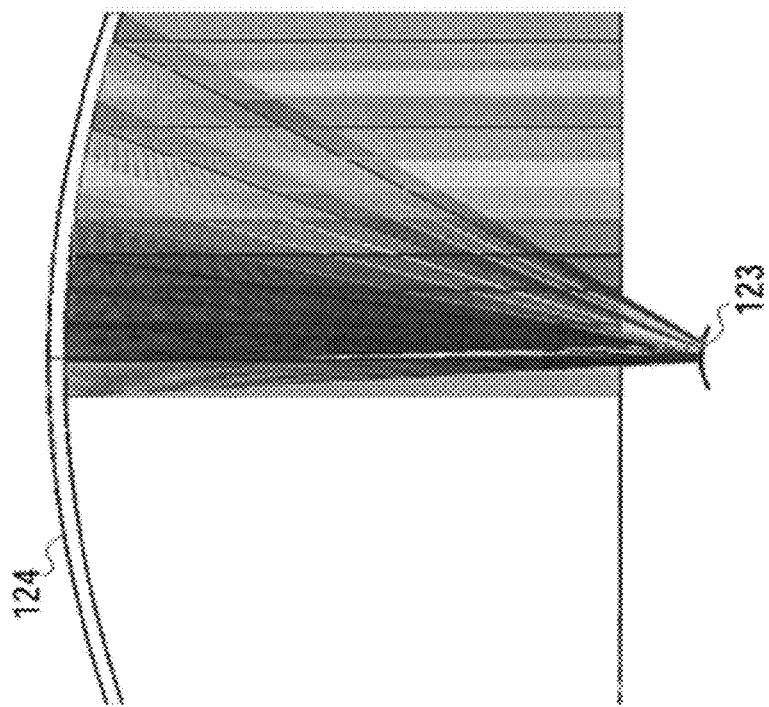
FIG. 4B is a diagram showing the beam size in the simulation result of FIG. 4A.
Figure 4A:
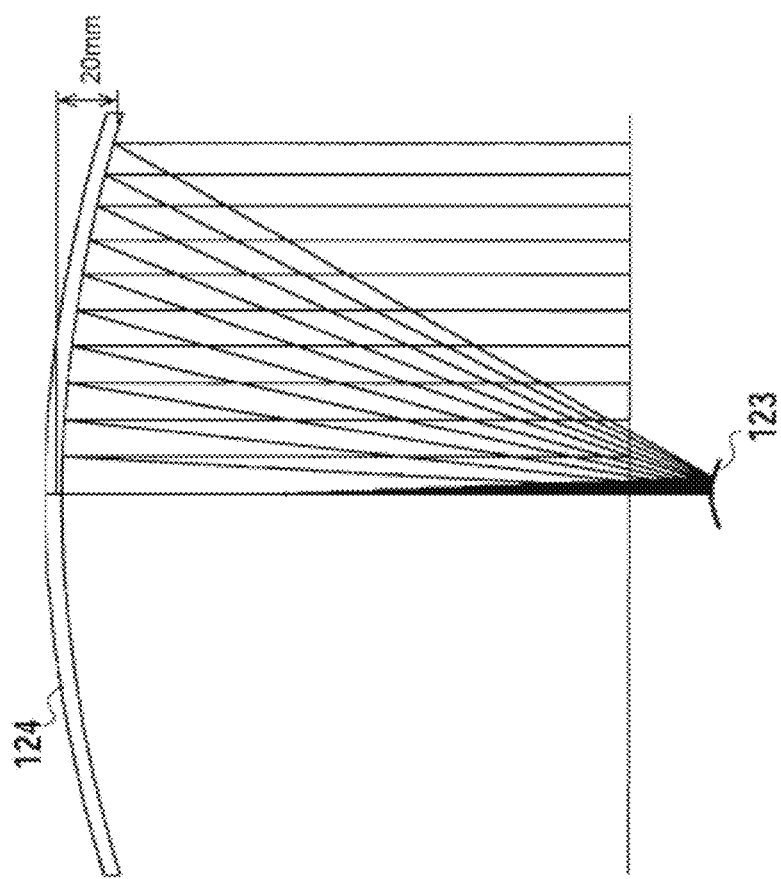
FIG. 4A is a diagram showing an example of a simulation result of the collimating mirror according to the present embodiment.

FIGS. 4A and 4B show a ZEMAX™ simulation of collimating mirror 124. In FIG. 4A, one ray represents one beam. FIG. 4B shows a beam size representation (edges of screen not represented).

Collimator mirror 124 is a concave cylindrical mirror of conical sag, which role is to render all the beams parallel to each other in the plane of incidence. FIG. 4 is a ZEMAX™ simulation of such a mirror in the illustrative case of FIGS. 2A and 2B. Cylindrical collimating mirror 124 can be made of light weight material (e.g., glass, polymer) with the powered surface coated with a reflective substrate (e.g., metal coating, like silver or aluminum). There are virtually no losses at cylindrical collimating mirror 124.

Cylindrical collimating mirror 124 can also be "Fresnelized" to be made thinner. This means that the sag of cylindrical collimating mirror 124 is cut into zones akin to a Fresnel lens, so cylindrical collimating mirror 124 can be flattened. For small displays, Fresnelizing cylindrical collimating mirror 124 is optional, as the sag can be sufficiently small that cylindrical collimating mirror 124 does not require making the mirror into a Fresnel mirror.

For large displays, cylindrical collimating mirror 124 should be a Fresnel mirror, as the maximum sag is too large to have a convenient design otherwise. For instance, in the example of FIGS. 4A and 4B, the maximum sag of conical collimating mirror is 20 mm, which may not be convenient to fabricate. Cylindrical collimating mirror 124 can be made thinner by making it a Fresnel-like mirror, by cutting cylindrical collimating mirror 124 into zones so that the maximum sag of each zone is kept under 5 mm or 1 mm (note: not optical Fresnel zones).

Figure 5A:
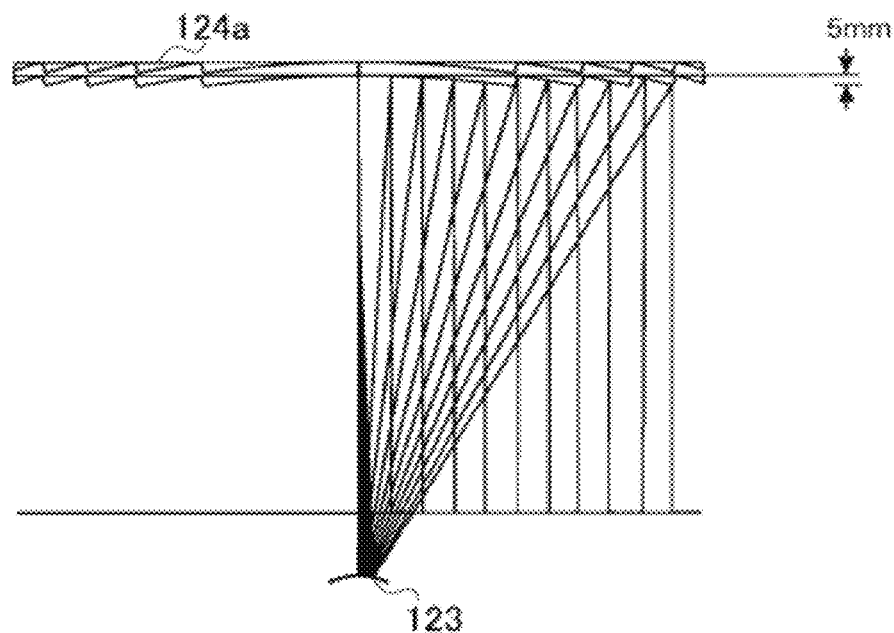
FIG. 5A is a diagram showing another example of a simulation result of the collimating mirror according to the present embodiment.
Figure 5B:
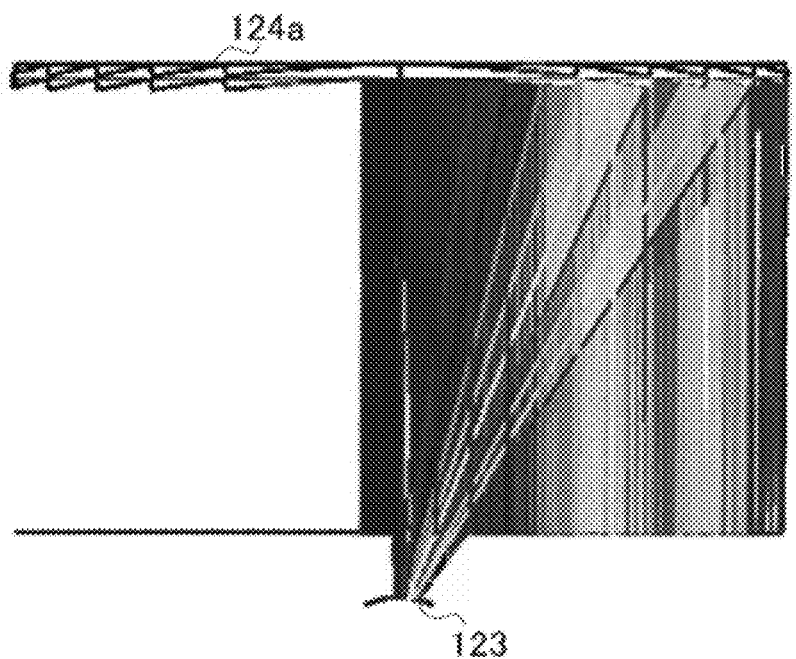
FIG. 5B is a diagram showing the beam size in the simulation result of FIG. 5A.
Figure 6A:
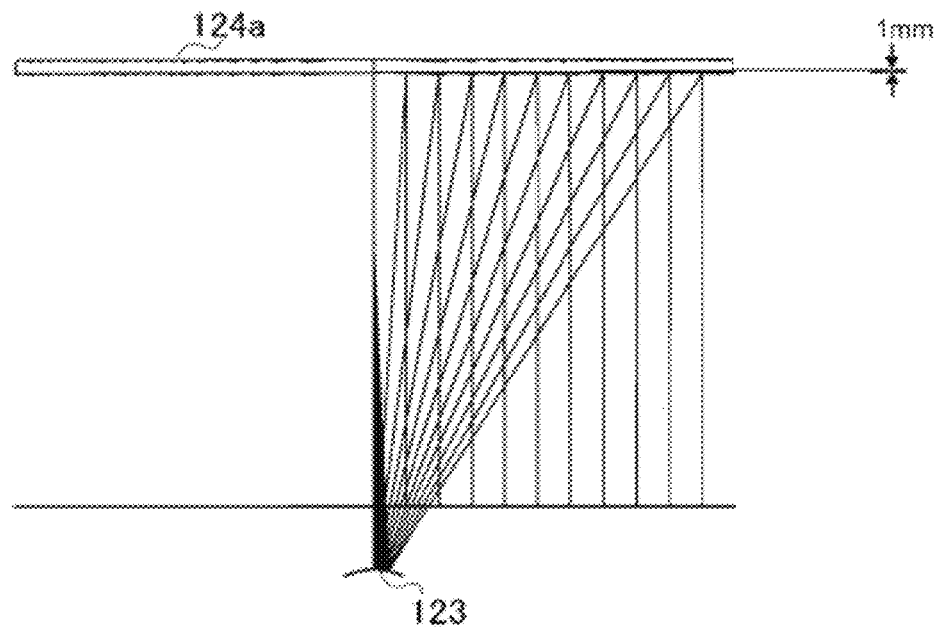
FIG. 6A is a diagram showing yet another example of a simulation result of the collimating mirror according to the present embodiment.
Figure 6B:
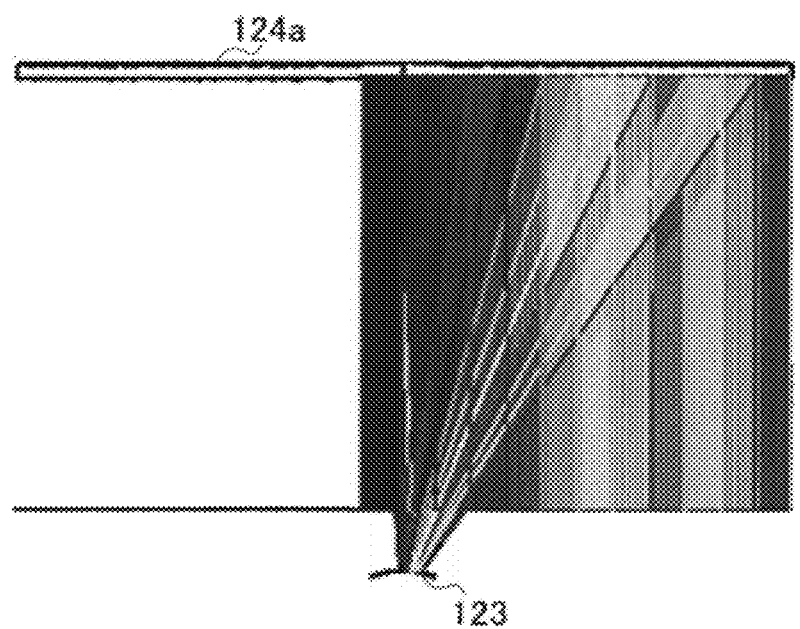
FIG. 6B is a diagram showing the beam size in the simulation result of FIG. 6A.

FIGS. 5A and 5B, and FIGS. 6A and 6B show ZEMAX™ simulation results of this "Fresnelization," that is, the case where collimating mirror 124a of the Fresnel type is used. In FIGS. 5A and 5B, the sag is reduced to 5 mm, and in FIGS. 6A and 6B, the sag is reduced to 1 mm. Due to the diffraction caused by the sharp edges introduced by "cutting" the collimating mirror, we may introduce some fast oscillations to the line of light. These can be averaged and smoothed out by the diffusing surface (radiation surface 125b) of the back panel. These can also be reduced by cutting the mirror in grooves proportional to Fresnel zones.

The sag of collimating mirror 124 should not be too complex (we want not too high degree of convexity or concavity in order to fabricate accurately such mirrors). For this purpose the distance between elements should be kept as large as possible (large working distances mean smaller angles to produce), however the method should allow to keep displays of any size thin and compact. One way of achieving this is to fold the laser beam path in the plane of the back panel. Since we use a reflective surface to expand the beam, it also serves as a folding mirror, which is another advantage to the convex mirror, in addition to having no loss at the surface and no dispersion. FIGS. 7-10 illustrate different configurations of how to implement this (collimator mirror not represented).

FIGS. 7-10 show different configurations for incoherent uniform illumination of flat screen back panel (optical guiding section 125). (Note that these are not to scale.)

One solution is to illuminate the back panel along its longest side, like we did in the example of FIGS. 2A and 2B. Convex mirror 123 is placed at the bottom (surface opposed to incidence surface 125a) of the back panel, and collimating mirror 124 is at the top (incidence surface 125a) of the back panel. As mentioned above, the half-angle for the fan of beams is 33.7 degrees in this case. This is schematized in FIG. 7 (collimating mirror not represented).

We can also dampen the constraints of the geometry by illuminating the back panel along its shortest side. This is the case schematized in FIG. 8, for which the angle to produce is now a tan(⅜)=20.5 degrees.

Figure 7:
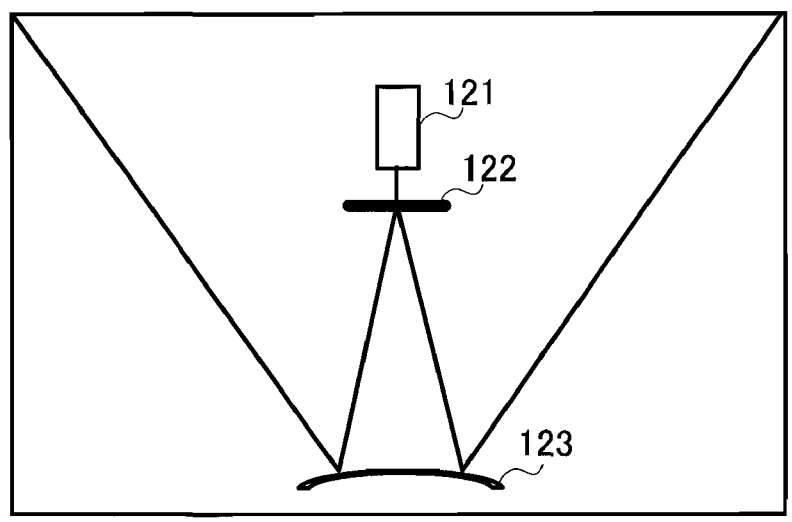
FIG. 7 is a schematic diagram illustrating one aspect of the present embodiment.
Figure 8:
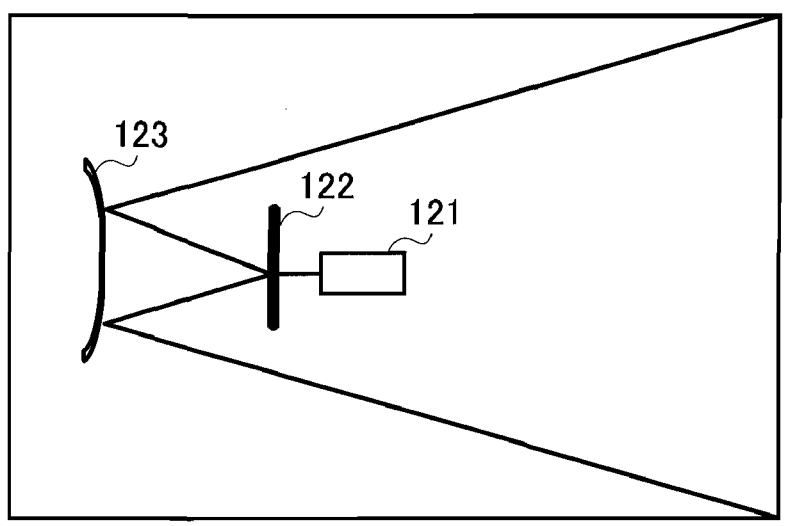
FIG. 8 is a schematic diagram illustrating another aspect of the present embodiment.
Figure 9:
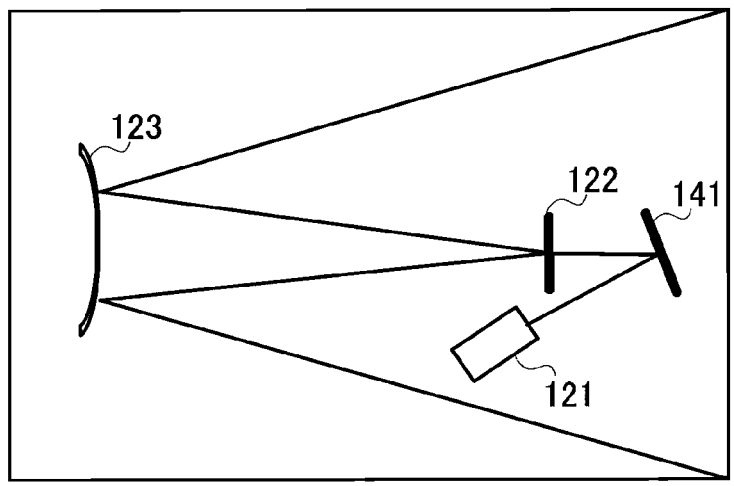
FIG. 9 is a schematic diagram illustrating yet another aspect of the present embodiment.

Additional folding mirrors 141 can be introduced prior to DOE 122 in FIG. 8 configuration, as illustrated in FIG. 9 (this also applies to FIG. 7 configuration). In this manner, DOE 122 can be placed as far as possible from convex mirror 123 for simpler sag. It may also be needed if the laser beam has to be collimated prior to DOE 122, to make room for additional optics, and/or ease of alignment.

Figures 10A, 10B:
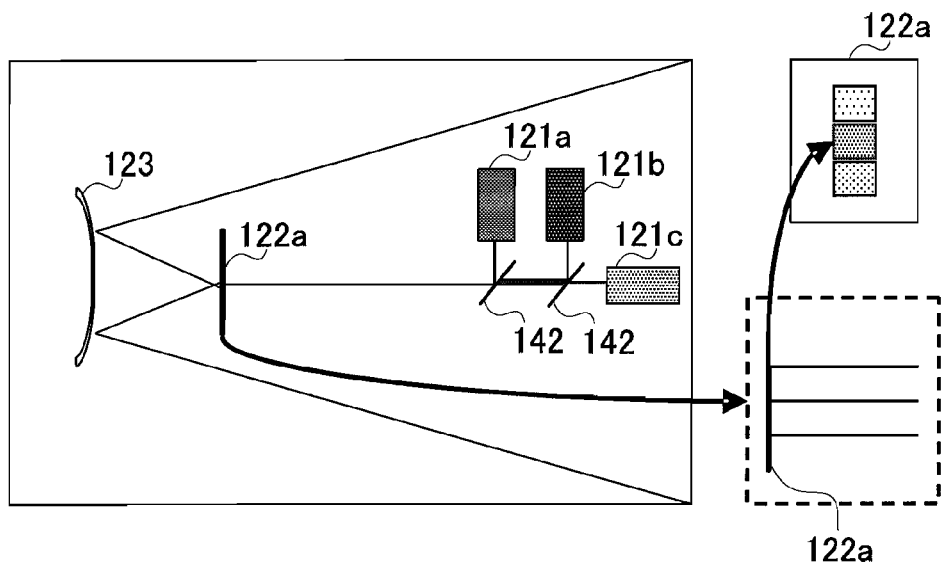
FIG. 10A is a schematic diagram illustrating yet another aspect of the present embodiment.
FIG. 10B is a side view of the main portion of FIG. 10A.
Figure 11:
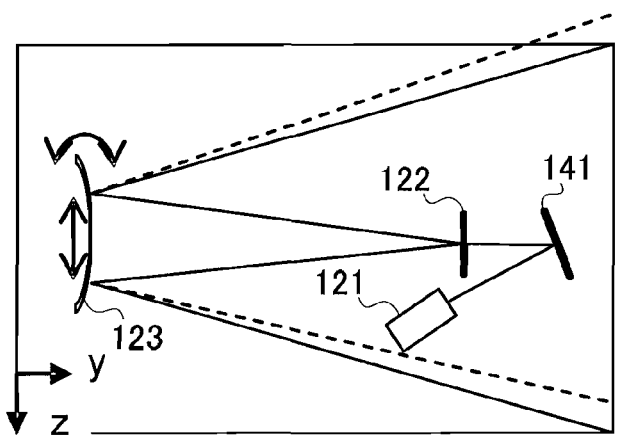
FIG. 11 is a schematic diagram illustrating an example of configuration to eliminate speckles, according to the present embodiment.

Finally, for this system, the three RGB colors are obtained with three separate lasers 121a, 121b, 121c in the configuration of FIG. 8, as shown in FIGS. 10A-10C (this applies also to FIG. 7, and folding mirrors may be introduced as in FIG. 9). DOEs 122 are wavelength sensitive, so each beam would be shaped by separate DOEs 122. In particular, DOEs 122a can be placed on the same plane, as an array, and be designed as to obtain the same fan angle for all colors, as can be well seen in FIGS. 10B and 10C. Note that the offset between each beam would be of only a few millimeters, as the initial size of the beams and size of DOEs 122 are small. Then, one unique convex cylindrical mirror 123 can be used for all three colors as the expander, since convex cylindrical mirror 123 is not dispersive. For the same reasons, cylindrical collimator mirror 124 shapes all color beams in the same manner. The three colors will then overlap in optical guiding section 125, creating white light.

FIGS. 11-15 show examples of configuration to eliminate speckles on the back panel (optical guiding section 125) (note that the figures are not to scale, with exaggerated angles).

The speckle effect is eliminated by moving slightly the beam around its position of alignment, in order to modify the temporal coherence of the laser beam to the human eye. In any of the configurations presented in FIGS. 7-10, convex mirror 123 can be moved slightly, oscillating with small amplitude either around its axis of rotation normal to plane of incidence, or laterally in the plane of incidence (or a combination of both). This is schematized in FIG. 11. The advantage of moving convex mirror 123 is that it alters the beam path after DOE 122. This way the alignment of the incident beam can be optimized to have DOE 122 perform at its best, and fixed. Note that DOE 122 is a periodic structure, so any lateral shift in the incident beam will just create the same lateral shift in the fan of beams, without loss of performances (as long as the whole beam goes through DOE 122). Convex mirror 123 would need to be shifted laterally as well, which is what a slight lateral motion does. Convex mirror 123 constantly moves around that position of perfect alignment, but this position does not need to be defined. Thereby the tolerances on the lateral position of the laser beam are not stringent. In a similar fashion, a rotation motion of convex mirror 123 would take care of compensating any slight departure from normal incidence on DOE 122 (small angle DOEs: if the incident beam comes at an angle, the entire output fan is rotated by the same angle, with no loss in performances). This solution not only eliminates the speckles, but also eases the constraints of alignment for the whole system.

Figure 12:
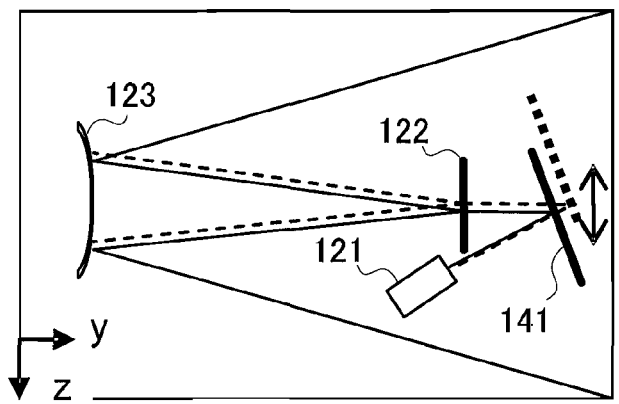
FIG. 12 is a schematic diagram illustrating another example of configuration to eliminate speckles, according to the present embodiment.
Figure 13:
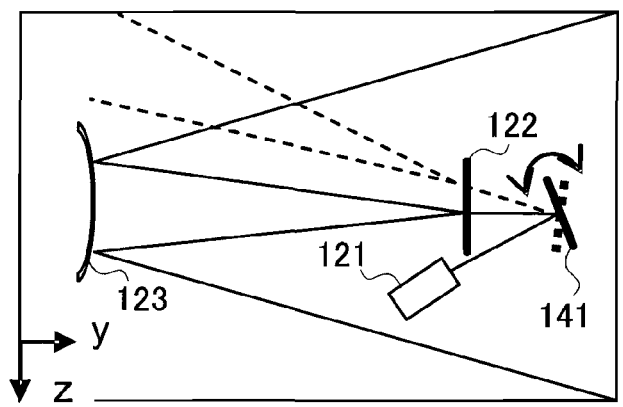
FIG. 13 is a schematic diagram illustrating yet another example of configuration to eliminate speckles, according to the present embodiment.

Instead of moving convex mirror 123, folding mirror 141 as introduced in FIG. 9 can also be moved, as shown in FIGS. 12 and 13. As mentioned above, a lateral shift of the incident laser beam shifts the whole fan of ray with the same lateral shift. This is done by shifting folding mirror 141 laterally (FIG. 12). Similarly, a tilt of the beam with respect to normal incidence on DOE 122 tilts the whole fan of beam with the same DC angle offset. This is done by having folding mirror 141 oscillate around its axis of rotation in the plane normal to the plane of incidence. In this case there is a tilt and a lateral shift (FIG. 13). As long as the laser beam goes through DOE 122, this is equivalent to moving convex mirror 123 as described above. Depending on which piece of optics is easiest to move, we can select one or the other. For the RGB system (FIGS. 10A-10C), folding mirror 141 to be oscillated would be placed after dichroic filters 142, where the beams are collinear.

Figure 14:
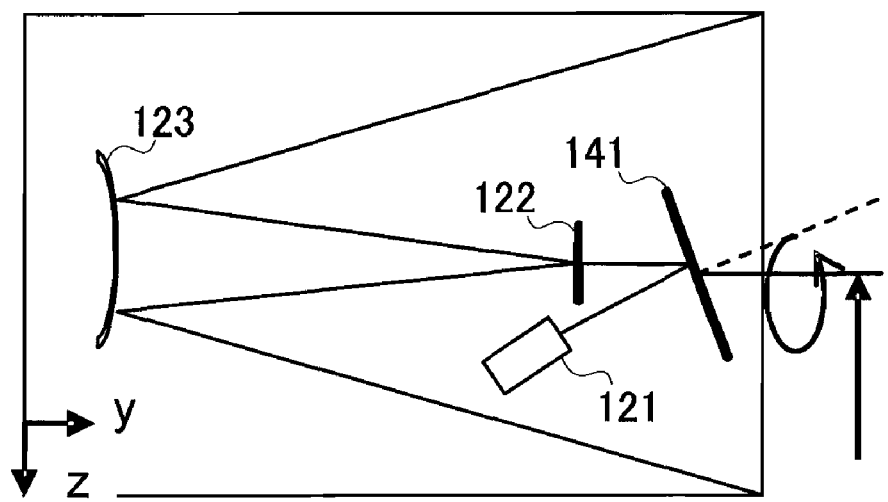
FIG. 14 is a schematic diagram illustrating yet another example of configuration to eliminate speckles, according to the present embodiment.

The mechanical setup to have a piece of optics oscillate between two positions (like a galvanometer) can be relatively expensive. A less expensive solution is to have a piece of optics rotate continuously around one axis (full rotation), with this axis being slightly wedged with respect to one surface. For instance, a rotating prism (small wedge) can be introduced in the incident beam. Or, a rotating folding mirror 141, with the axis of rotation at a slight angle with the normal to the plane of the mirror, as illustrated in FIG. 14. The angle and position of the axis is determined by the movement desired for the beam on DOE 122 (tilt, shift, or both).

Figure 15:
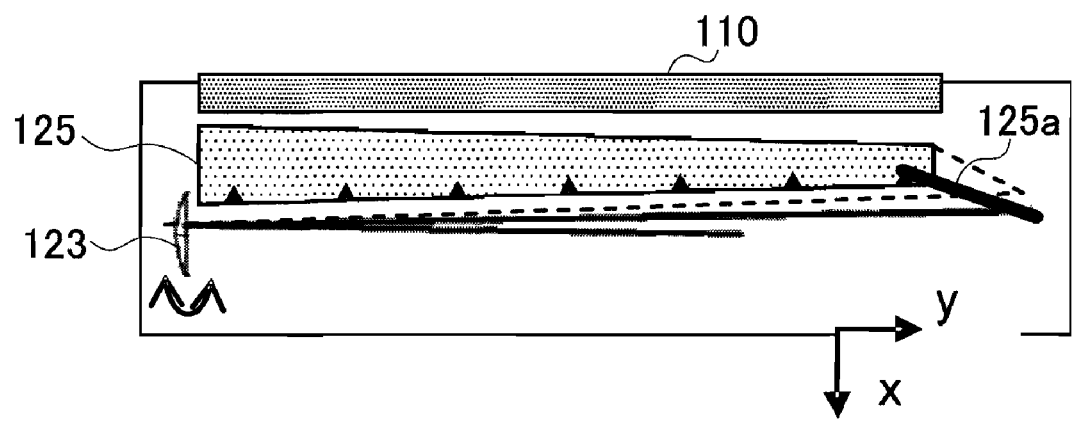
FIG. 15 is a schematic diagram illustrating yet another example of configuration to eliminate speckles, according to the present embodiment.

So far the proposed solutions displace the beam(s) in the plane of incidence. It is also possible to displace the beams in the plane normal to the plane of incidence (side view of panel), for instance having convex mirror 123 oscillate slightly in this plane, as illustrated in FIG. 15. The result of such a displacement is a slightly different angle of incidence in optical guiding section 125 designed to illuminate incidence surface 125a.

The configurations we described make for a simple and efficient solution to enable high performance laser back-lit flat panel display technology. Small angle DOE-beam shaping provides high efficiency and high uniformity, while the combined use of mirrors with purposely designed, non-complex sags ensures precision and scalability without degrading performances nor adding complexity to the system. This would not be the case with a DOE-only method, as high-angle DOEs are inefficient and lack uniformity. It also includes a solution to eliminate the speckle effect which takes advantage of the non-stringent tolerances on alignment of this method, unlike all-refractive/reflective methods or high-angle DOEs. This method relies on elements which individually are readily available on a production scale, which makes this method inexpensive.

What is claimed is:

1. A surface light emitting apparatus comprising:
   a light source section that includes at least one light source that emits a first laser beam;
   an optical element section that includes at least one diffractive optical element that modifies, by diffraction, a wavefront of the first laser beam emitted from the light source section to form a second laser beam; and
   an optical guiding section that comprises an incidence surface and a radiation surface, and guides the second laser beam formed by the diffractive optical element and received at the incidence surface, and emits the guided second laser beam through the radiation surface,
   wherein the optical element section further includes at least one altering optical element that alters an angle of a propagating direction of the second laser beam formed by the diffractive optical element;
   the altering optical element is a collimating optical element that makes a plurality of the second laser beams formed by the diffractive optical element propagate in directions parallel to one another; and
   the collimating optical element is a mirror that is folded into zones as a Fresnel optical element.

* * * * *